US012312853B1

(12) United States Patent
Parsadayan et al.

(10) Patent No.: US 12,312,853 B1
(45) Date of Patent: May 27, 2025

(54) RETROFIT GATE OPERATOR WITH ADJUSTABLE IDLER SPROCKETS

(71) Applicants: Walter Parsadayan, Newport Coast, CA (US); Peter Parsadayan, Newport Coast, CA (US)

(72) Inventors: Walter Parsadayan, Newport Coast, CA (US); Peter Parsadayan, Newport Coast, CA (US)

(73) Assignee: Intelligent Entry Machines LLC, Irvine, CA (US)

( * ) Notice: Subject to any disclaimer, the term of this patent is extended or adjusted under 35 U.S.C. 154(b) by 0 days.

(21) Appl. No.: 17/680,148

(22) Filed: Feb. 24, 2022

Related U.S. Application Data

(60) Provisional application No. 63/158,117, filed on Mar. 8, 2021.

(51) Int. Cl.
*E05F 15/643* (2015.01)
*E06B 11/02* (2006.01)

(52) U.S. Cl.
CPC .......... *E05F 15/643* (2015.01); *E06B 11/026* (2013.01); *E05Y 2201/43* (2013.01); *E05Y 2201/656* (2013.01); *E05Y 2201/668* (2013.01); *E05Y 2201/71* (2013.01); *E05Y 2600/14* (2013.01); *E05Y 2600/51* (2013.01); *E05Y 2600/62* (2013.01); *E05Y 2600/626* (2013.01); *E05Y 2900/40* (2013.01)

(58) Field of Classification Search
CPC ............................ E05F 15/643; E06B 11/026
USPC ............................................................ 49/347
See application file for complete search history.

(56) References Cited

U.S. PATENT DOCUMENTS

| | | | | | |
|---|---|---|---|---|---|
| 889,606 | A * | 6/1908 | Hicks | B28C 5/4255 | 416/7 |
| 1,017,735 | A * | 2/1912 | Bradford et al. | B65B 1/32 | 177/109 |
| 1,105,469 | A * | 7/1914 | Utterback | E02F 3/6463 | 37/432 |
| 2,146,507 | A * | 2/1939 | Mayer | B41L 1/00 | 118/63 |
| 2,730,364 | A * | 1/1956 | Thomsen | B65H 29/042 | 101/409 |
| 3,220,532 | A * | 11/1965 | Vamvakas | B08B 9/44 | 198/408 |
| 4,549,369 | A | 10/1985 | Foley, Jr. | | |
| 4,852,300 | A | 8/1989 | Keast | | |
| 6,091,217 | A * | 7/2000 | Parsadayan | E05F 15/41 | 318/285 |
| 2003/0034750 | A1* | 2/2003 | Hom | E05F 15/635 | 318/445 |
| 2007/0200519 | A1* | 8/2007 | Murphy | E05F 15/686 | 318/280 |
| 2009/0206777 | A1* | 8/2009 | Taheri | E05F 15/643 | 49/31 |
| 2013/0318877 | A1* | 12/2013 | Dalman | E06B 11/045 | 49/358 |

(Continued)

*Primary Examiner* — Gregory J Strimbu
(74) *Attorney, Agent, or Firm* — Martin Fessenmaier; Umberg Zipser LLP

(57) ABSTRACT

A gate operator has one or more vertically adjustable idler sprockets that allow to correct for a vertical offset between a gate bracket and the idler sprockets. In preferred aspects, the idler sprockets and a motor of the gate operator are movably coupled to a mounting structure via respective mounting interfaces.

10 Claims, 14 Drawing Sheets

(56) References Cited

U.S. PATENT DOCUMENTS

| | | | | |
|---|---|---|---|---|
| 2014/0259930 | A1* | 9/2014 | Gilliam | E05F 15/635<br>49/70 |
| 2014/0331560 | A1* | 11/2014 | Romero | E05D 15/063<br>49/352 |
| 2015/0269817 | A1* | 9/2015 | Parsadayan | E06B 11/026<br>49/13 |
| 2019/0338579 | A1* | 11/2019 | Qiu | E05F 15/643 |
| 2022/0154515 | A1* | 5/2022 | Bayley | E05F 15/646 |
| 2022/0177276 | A1* | 6/2022 | Kashiwakura | E05F 15/643 |

* cited by examiner

RETROFIT GATE OPERATOR WITH ADJUSTABLE IDLER SPROCKETS

This application claims priority to our U.S. Provisional Patent Application with the Ser. No. 63/158,117, which was filed Mar. 8, 2021, and which is incorporated by reference herein.

FIELD OF THE INVENTION

The field of the invention is systems, devices, and methods for retrofitting moveable barriers, and especially with gate operators that are coupled to the moving barrier via a chain.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

All publications and patent applications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Access control gates are common throughout industrial and residential properties, and a significant number of these gates are moved using a gate operator that acts upon a chain or other tether that is coupled to a gate bracket. Prior art FIG. 1 depicts one common type of installation where a chain is connected at its ends to respective gate brackets, and where a gate operator has a motor and drive gear to move the chain and two idler sprockets to ensure contact of the chain with the drive gear. Prior art FIG. 2 depicts another common type of installation ('bicycle type') where the gate operator is at the end of the gate's moving range. Once more, the drive gear moves the chain while the idler sprockets ensure proper routing and positioning of the chain. While FIGS. 1 and 2 depict single panel gates, it should be recognized that multiple gate panels can also be used and exemplary sliding or rolling gates are described in U.S. Pat. Nos. 4,549,369A and 4,852,300A.

Over time, gate operators encounter failure or become outdated, and a new gate operator will need to be installed. Unfortunately, the newly installed gate operator will in many cases not exactly match the prior gate operator, which either requires removal and rewelding of the gate brackets or a cumbersome modification of the base and/or gate operator to avoid offset between the gate bracket and the drive mechanism. Prior art FIG. 3 depicts a typical installation problem where the new gate operator is at a lower position relative to the prior gate operator. Here, as the gate bracket approaches the gate operator, a vertical offset exerts increasing forces on the gate bracket and idler sprocket, leading to rapid deterioration and ultimately failure. Similarly, prior art FIG. 4 depicts another typical installation problem where the new gate operator is closer to the gate relative to the prior gate operator. Consequently, as the gate bracket approaches the gate operator, a horizontal offset exerts increasing forces on the gate bracket and idler sprocket, leading once more to rapid deterioration and ultimately failure. Clearly, misplacement of the gate operator and/or correction of such misplacement are typically burdensome and expensive.

Thus, even though various systems and methods moving barriers are known in the art, all or almost all of them suffer from several drawbacks. Therefore, there remains a need for compositions and methods for improved gate operators, especially where gate operators are installed in a repair or retrofit.

SUMMARY OF THE INVENTION

The inventive subject matter is directed to various devices and methods of adjusting potential offset in a gate operator to facilitate and/or simplify installation of a gate operator to a gate. Contemplated devices and methods are especially advantageous where a new gate operator is installed into an already existing gate structure, or where an existing gate operator is retrofitted to so accommodate for potential offset.

In one aspect of the inventive subject matter, the inventor contemplates a method of installing a gate operator for a movable gate having a gate bracket that includes a step of installing a gate operator to a base, wherein the gate operator has a mounting structure to which are coupled (i) a motor that is coupled to a drive unit and (ii) at least one idler sprocket. Most typically, the idler sprocket is movably coupled to the mounting structure in a vertical direction, and where desired, the motor and/or drive unit is movably coupled to the mounting structure in a vertical direction. It is further generally preferred that the mounting structure is configured to facilitate vertical adjustment the idler sprocket to a non-offset position relative to the gate bracket. Therefore, upon determination of a vertical offset of the idler sprocket relative to the gate bracket, the idler sprocket can be readily vertically adjusted to the non-offset position.

Of course, it should be recognized that contemplated gate operators may also have two or more idler sprockets, each being movably coupled to the mounting structure in the vertical direction. In addition, it is contemplated that the motor and/or drive unit may also be vertically adjusted relative to the base. Preferably, but not necessarily, vertical adjustment is in a continuous fashion. Therefore, the idler sprocket, the motor, and/or the drive unit may be coupled to the mounting structure via a guide rail or a slotted channel. Moreover, it is contemplated that the step of installing may further include a step of horizontal adjustment of the gate operator to a non-offset position relative to the gate bracket. In common embodiments, the gate bracket is coupled to the drive unit and the idler sprocket via a chain.

In further embodiments, the idler sprocket can be vertically adjusted over a distance of at least 10 inches, and/or the motor can be vertically adjusted over a distance of at least 2 inches. As will also be readily appreciated, the gate operator may be a retrofit installation (new gate operator installation into an existing gate with an existing gate bracket) or a de novo installation (new gate operator installation into a new gate with a new gate bracket).

Therefore, the inventor also contemplates a gate operator that includes a mounting structure to which are coupled (i) a motor coupled to a drive unit and (ii) at least one idler sprocket, wherein the mounting structure further comprises a first mounting interface and a second mounting interface. Preferably, the first mounting interface is sized and dimensioned to receive, optionally movably couple in a vertical direction, and retain the motor with the drive unit, and the second mounting interface is sized and dimensioned to receive, movably couple in a vertical direction, and retain the at least one idler sprocket.

In some embodiments, the idler sprocket and the motor are coupled to opposite sides of the mounting structure. In further embodiments, the first mounting interface comprises a slotted channel or a plurality of through holes (e.g., having a length of between 1 and 5 inches), and/or the second mounting interface comprise a guide rail or a slotted channel (e.g., having a length of between 5 and 15 inches). Typically, but not necessarily, a third mounting interface may be included that is sized and dimensioned to receive, movably couple in a vertical direction, and retain a second idler sprocket.

Thus, viewed from a different perspective, the inventor also contemplates a method of correcting offset of a gate operator from a gate bracket that includes a step of vertically adjusting a position of an idler sprocket, wherein the idler sprocket is coupled to a mounting interface of a mounting structure, and wherein the mounting interface facilitates vertical adjustment of the idler sprockets to a non-offset position relative to the gate bracket. Optionally, such method may also include a step of vertically adjusting a position of a motor and/or drive unit of the gate operator, wherein the motor and/or drive unit is coupled to another mounting interface that facilitates vertical adjustment of the motor and/or drive unit. Further, the inventor also contemplates a method of installing a gate operator for a movable gate having a gate bracket, comprising installing a gate operator to a base, wherein the gate operator has a mounting structure to which are coupled (i) a motor that is coupled to a drive unit and (ii) at least one idler sprocket: wherein the at least one idler sprocket is movably coupled to the mounting structure in a vertical direction, and optionally wherein the motor and/or drive unit is movably coupled to the mounting structure in a vertical direction: wherein the mounting structure is configured to facilitate vertical adjustment of at least one of the idler sprockets to a non-offset position relative to the gate bracket; and upon determination of a vertical offset of the at least one of the idler sprocket relative to the gate bracket vertically adjusting the at least one of the idler sprocket to the non-offset position.

Various objects, features, aspects and advantages of the inventive subject matter will become more apparent from the following detailed description of preferred embodiments, along with the accompanying drawing figures in which like numerals represent like components.

DETAILED DESCRIPTION

The inventor has discovered that vertical offset with gate operators can be corrected in a conceptually simple and effective manner in which one or more idler sprockets are coupled to a mounting structure having a mounting interface to so allow for vertical movement and affixing to a desired vertical position. Where desired, the mounting structure or the gate operator may include a further mechanism that allows for horizontal adjustment of the idler sprockets to also allow for correction of any potential horizontal offset. Preferably, contemplated devices will further allow for vertical adjustment of the motor and drive unit that are also coupled to the mounting structure via mounting interface.

Figure 1:
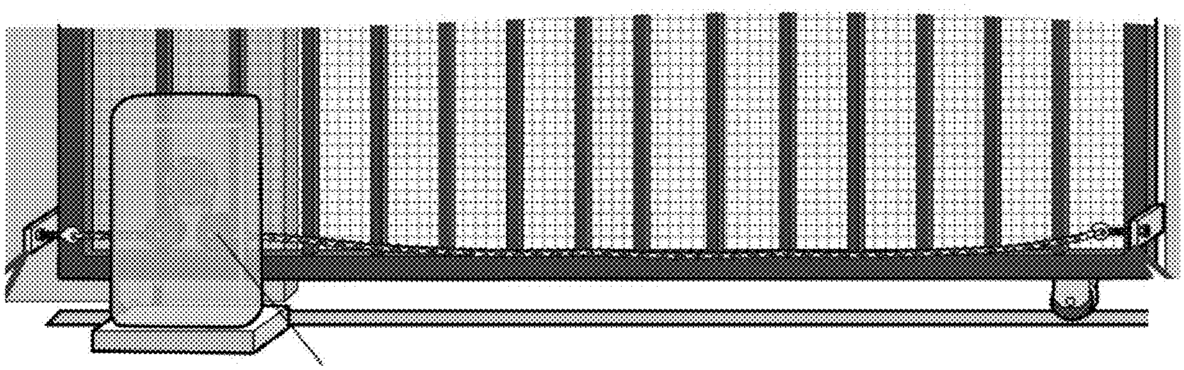
FIG.1 (Prior Art)
FIG. 1 is an exemplary schematic of a conventional installation of a gate operator in "normal" installation mode.
Figure 2:
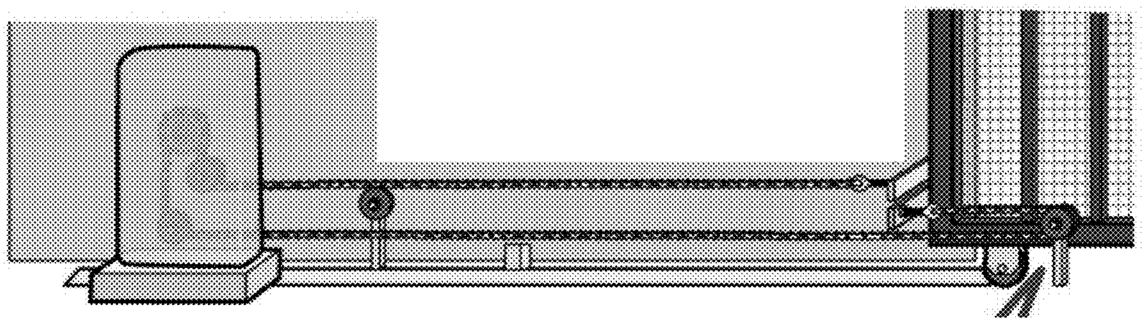
FIG.2 (Prior Art)
FIG. 2 is an exemplary schematic of a conventional installation of a gate operator in "bicycle" installation mode.
Figure 3:
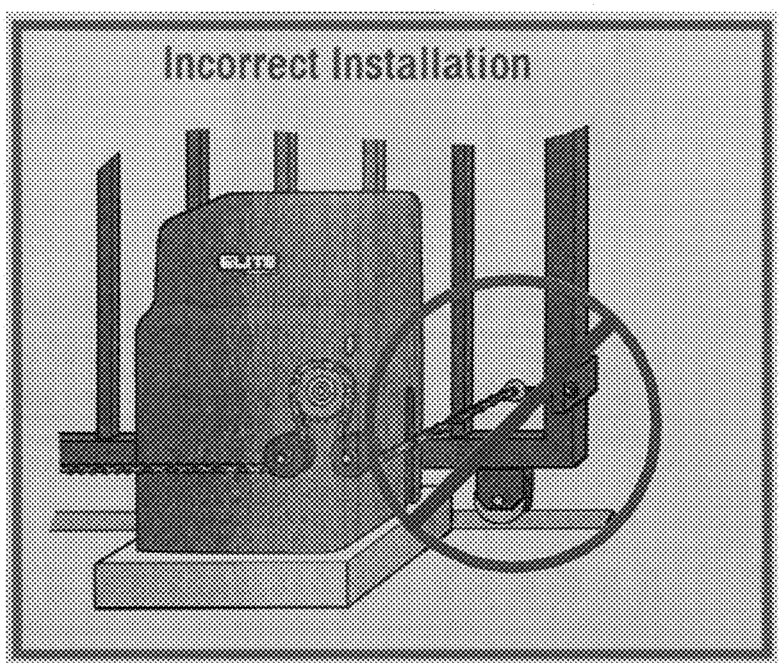
FIG.3 (Prior Art)
FIG. 3 is an exemplary schematic of an incorrect installation of a gate operator due to a vertical offset between idler sprocket and a gate bracket.
Figure 4:
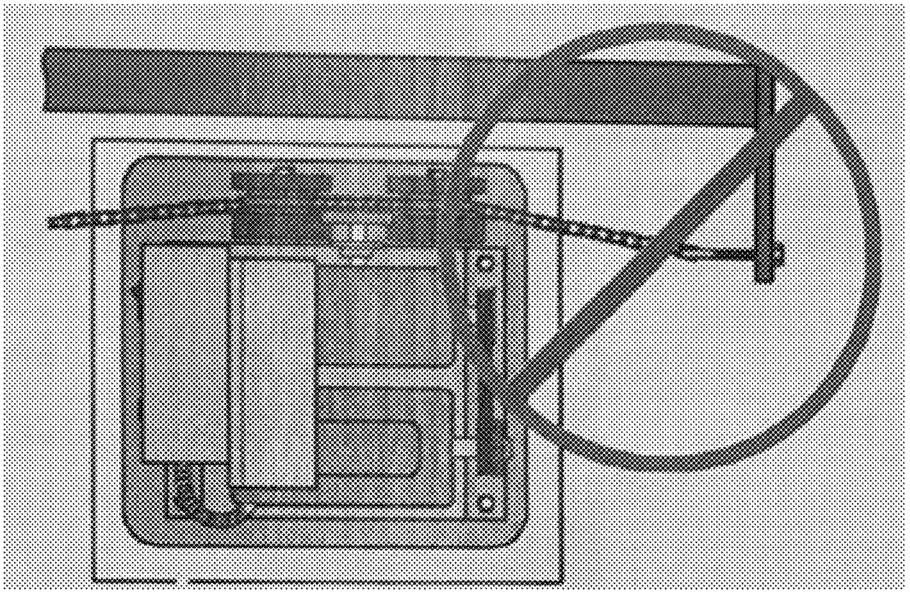
FIG.4 (Prior Art)
FIG. 4 is an exemplary schematic of an incorrect installation of a gate operator due to a horizontal offset between idler sprocket and a gate bracket.
Figure 5:
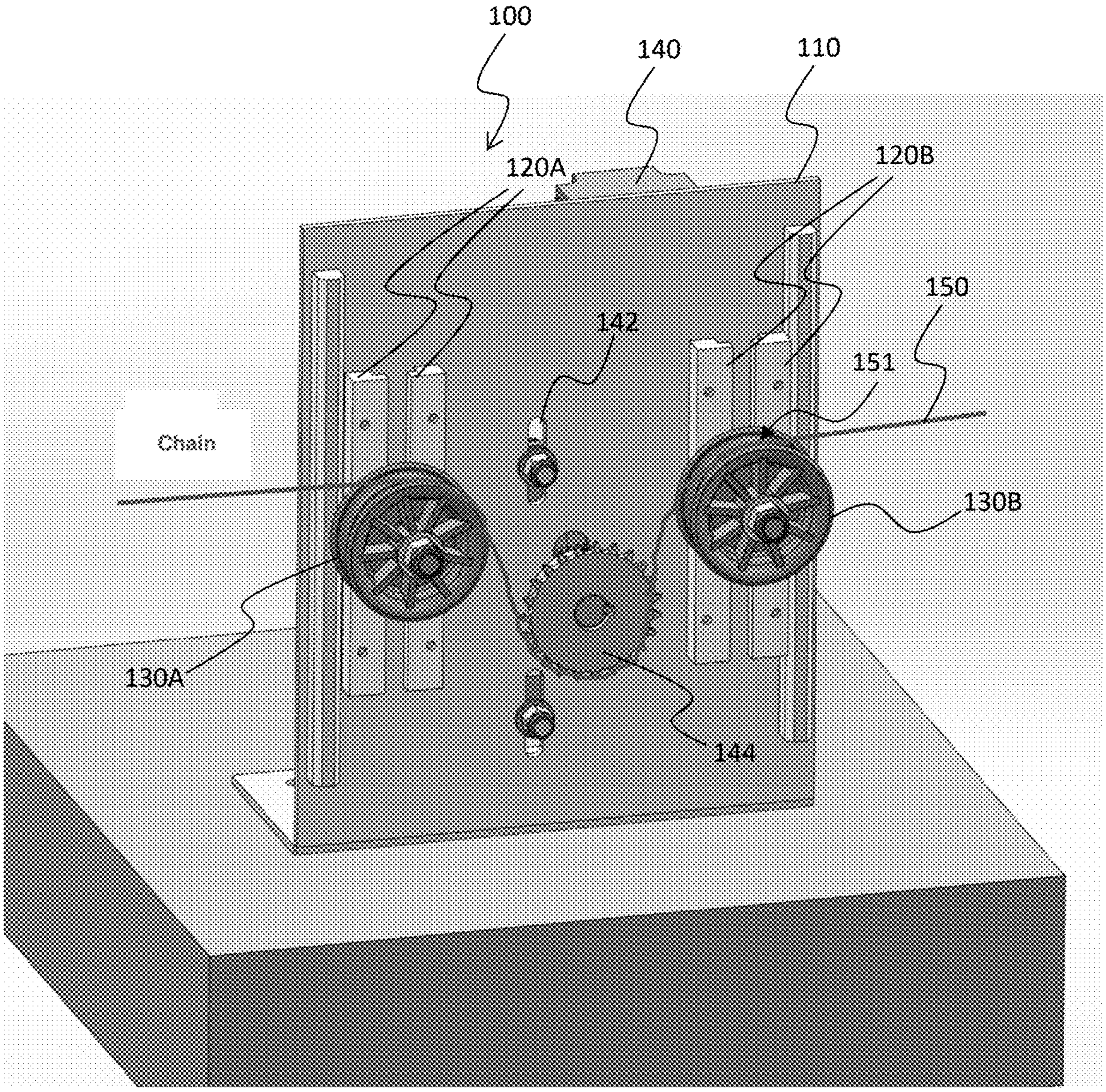
FIG. 5 is an exemplary partial schematic of a gate operator with vertically adjustable idler sprockets and vertically adjustable drive unit/motor according to the inventive subject matter.
Figure 6:
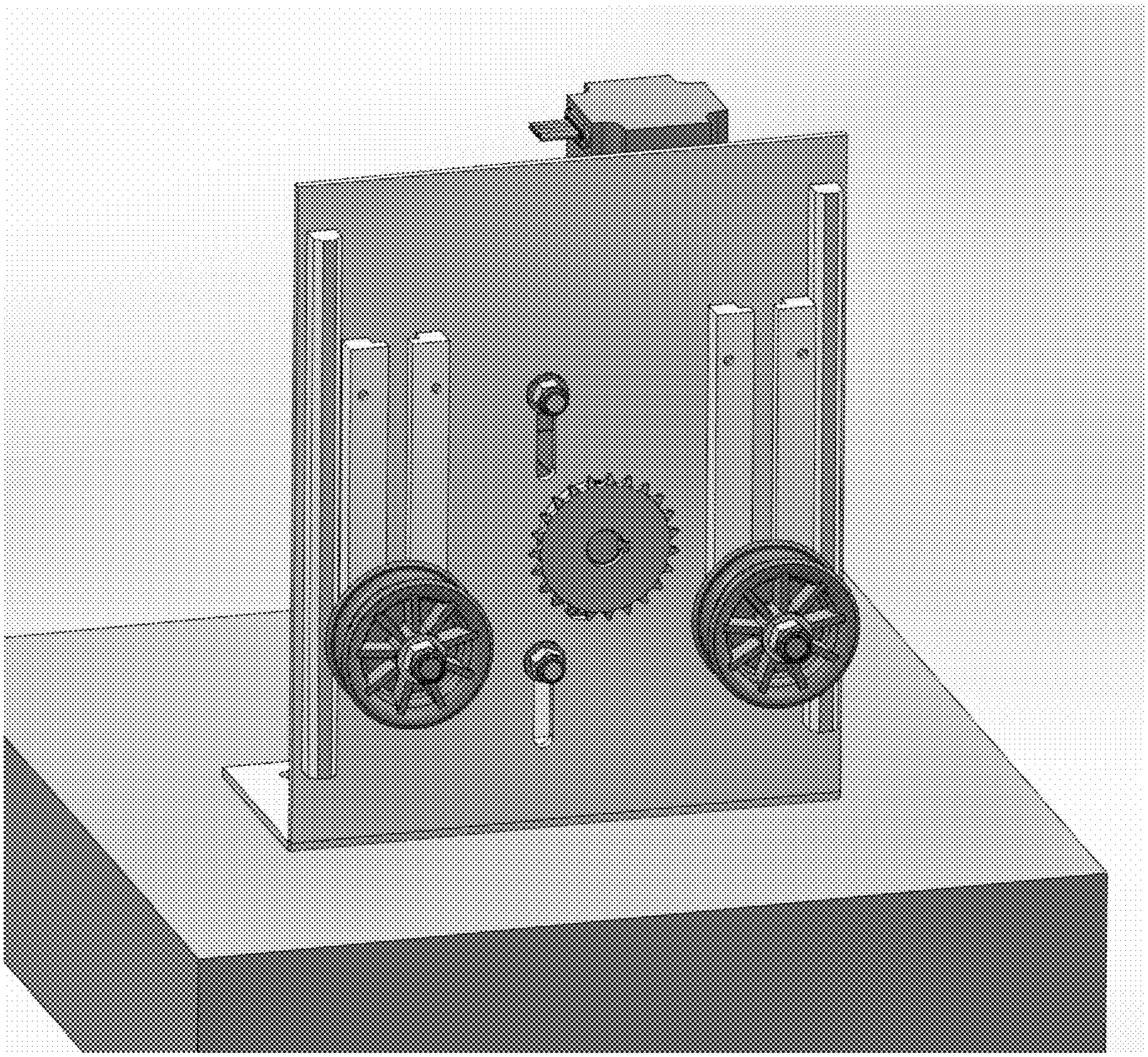
FIG. 6 is the schematic of FIG. 5 with both idler sprockets adjusted to a low position.
Figure 7:
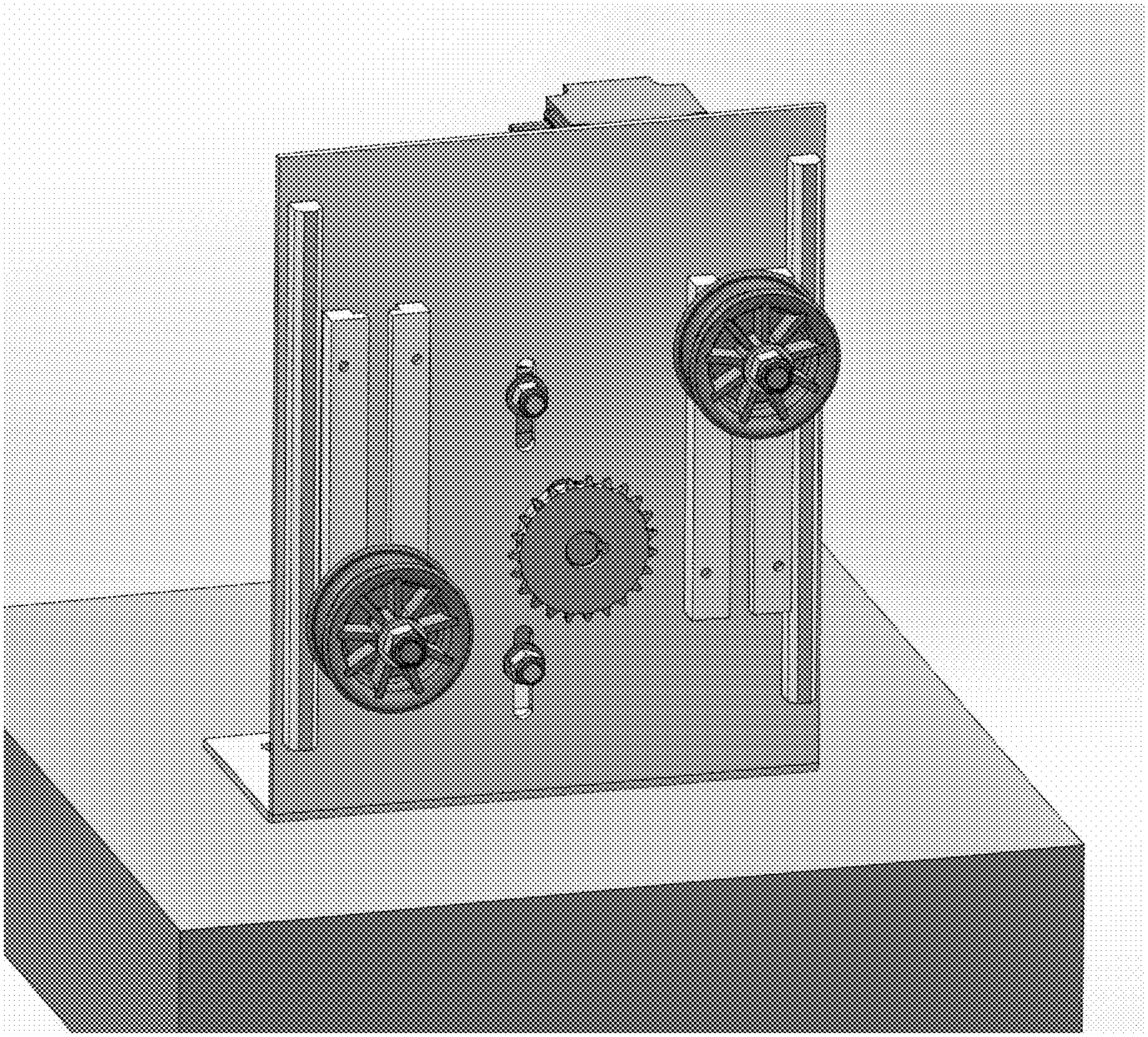
FIG. 7 is the schematic of FIG. 5 with one idler sprocket adjusted to a low position and the other adjusted to a high position.
Figure 8:
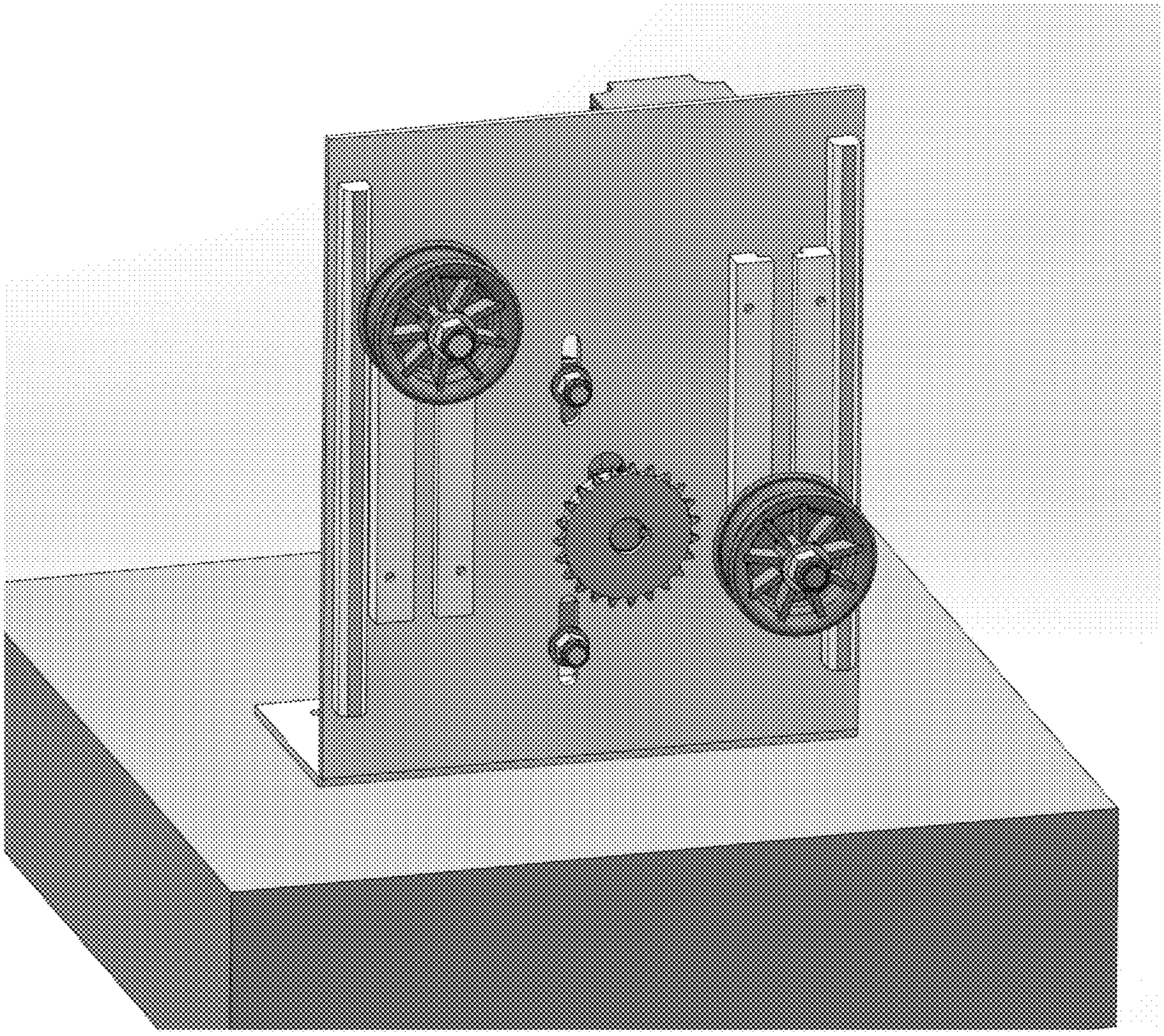
FIG. 8 is the schematic of FIG. 5 with one idler sprocket adjusted to a high position and the other adjusted to a low position.
Figure 9:
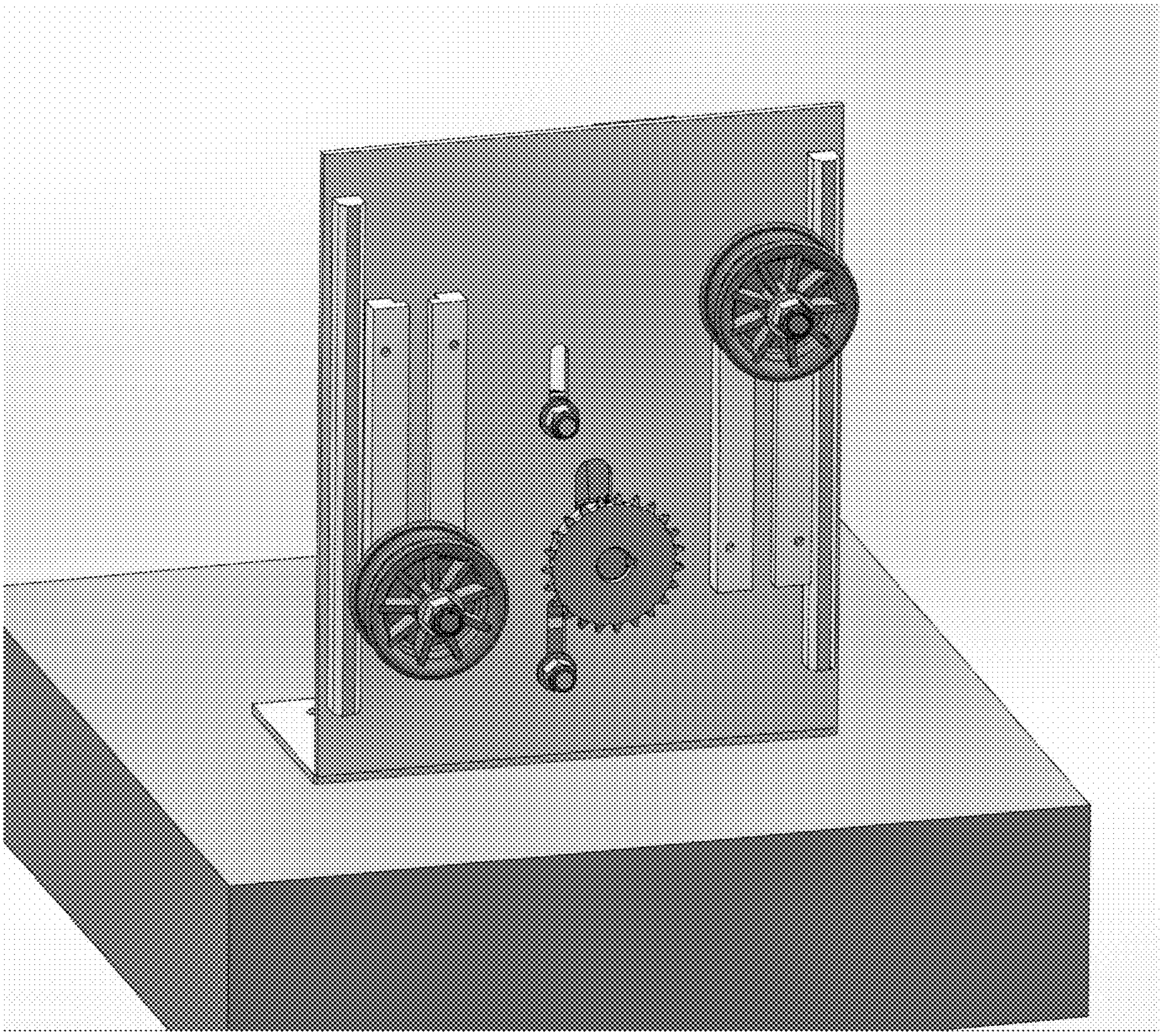
FIG. 9 is the schematic of FIG. 5 with the drive unit/motor adjusted to a low position.

For example, one contemplated gate operator 100 is depicted in FIG. 5 where an L-shaped mounting structure 110 has two guide rails 120A, 120B acting as mounting interface to which two idler sprockets 130A, 130B are movably coupled and where a motor 140 is coupled to the mounting structure via a slotted channel 142 acting as an additional mounting interface with the motor and drive unit (not shown in FIG. 5) on one side and a gear 144 (driven by the motor and drive unit) on the other side of the structure. A chain 150 can then be routed over the gear 144 and idler sprockets 130A, 130B. As can be readily seen from FIG. 5, the idler sprockets are vertically movable along the guide rails 120A, 120B, such that there is no vertical offset between a location 151 where the chain 150 is at a horizontal tangent to the idler sprocket 130B and extends toward a gate bracket and a location where the chain 150 couples to the gate bracket. FIG. 6 shows the device of FIG. 5 with both idler sprockets in a lowered position and the motor and drive unit in an upper position. FIG. 7 shows the device with one idler sprocket in a lower position while the other idler sprocket is in an elevated position, and FIG. 8 depicts the inverse position of the idler sprockets. As noted earlier, in at least some embodiments the motor is coupled to the mounting structure and is movable in vertical direction as exemplarily shown in FIG. 9 where the motor is in a lowered position.

Figure 10:
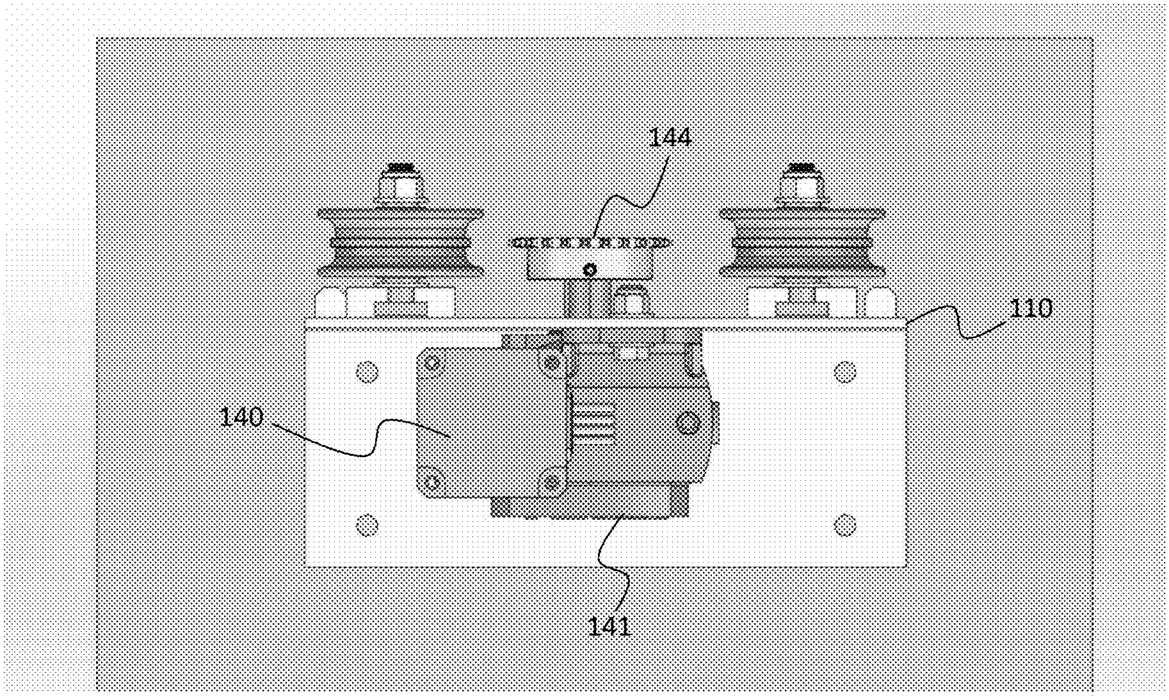
FIG. 10 is a top view of the schematic of FIG. 5.
Figure 11:
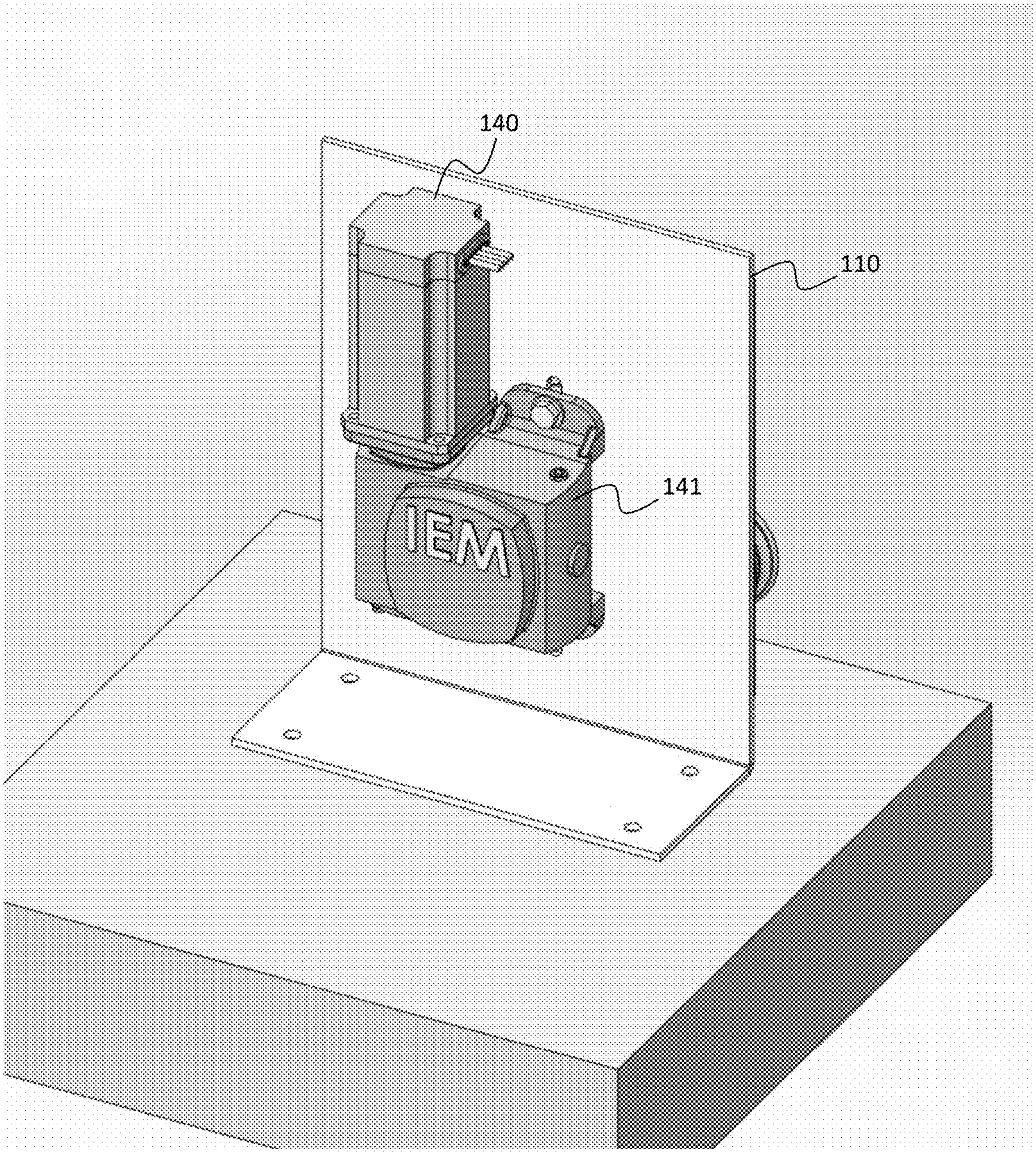
FIG. 11 is a rear perspective view of the schematic of FIG. 5.
Figure 12A:
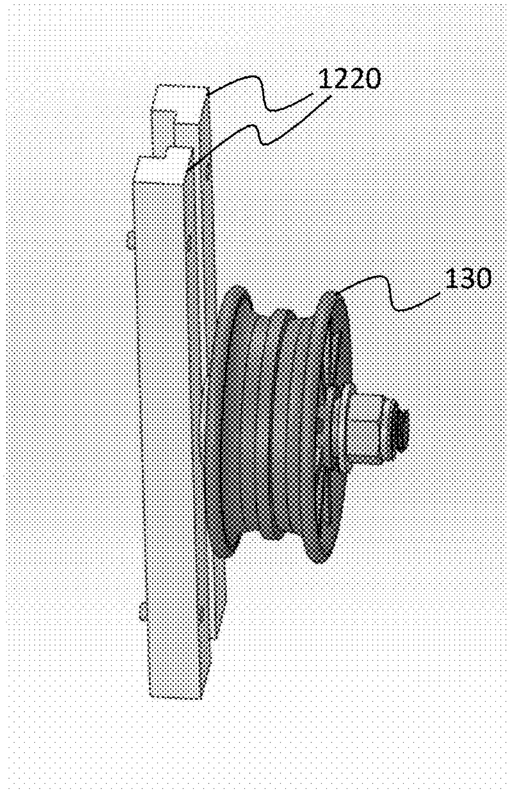
FIG. 12A is a detail view of an assembly for the vertically adjustable idler sprocket of FIG. 5.
Figure 12B:
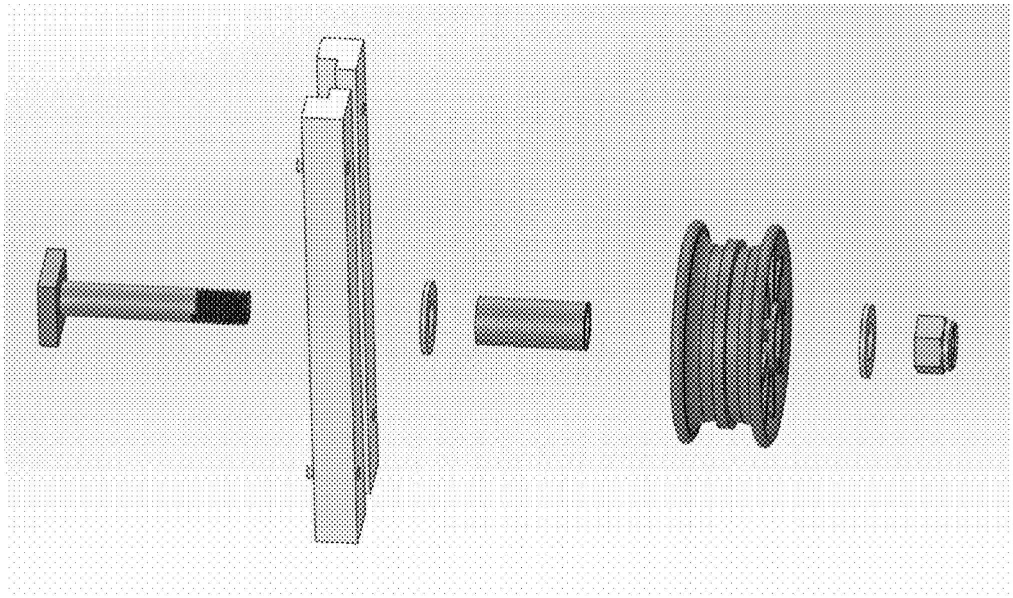
FIG. 12B is an exploded detail view of FIG. 12A.

FIG. 10 is a top view of the assembly in which the motor 140 and drive unit 141 are coupled to one side of the mounting structure 110 while the gear 144 that is driven by the motor and drive unit is located at the opposite side of the mounting structure. FIG. 11 is a perspective rear view of the assembly showing the L-shaped mounting structure 110, motor 140, and drive unit 141. FIG. 12A is a detail view showing an exemplary guide rail 1220 for an idler sprocket, while FIG. 12B depicts the same guiderail and idler sprocket in an exploded view.

Of course, it should be appreciated that the mounting structure need not be L-shaped but may have multiple different geometries so long as such geometries will accommodate at least one (or preferably at least two) vertically movable idler sprocket. It is also preferred, but not required that the mounting structure will also accommodate the motor and drive unit. Therefore, suitable mounting structures include plates, L- I-, and U-shaped elements, etc. Still further, it should be appreciated that the mounting structure may form or be part of a housing for a gate operator. Likewise, it should be recognized that the mounting interface for the idler sprocket and/or the motor may vary considerably, and all types of interfaces are deemed suitable so long as they allow for vertical movement of the sprocket and/or motor.

Figure 13:
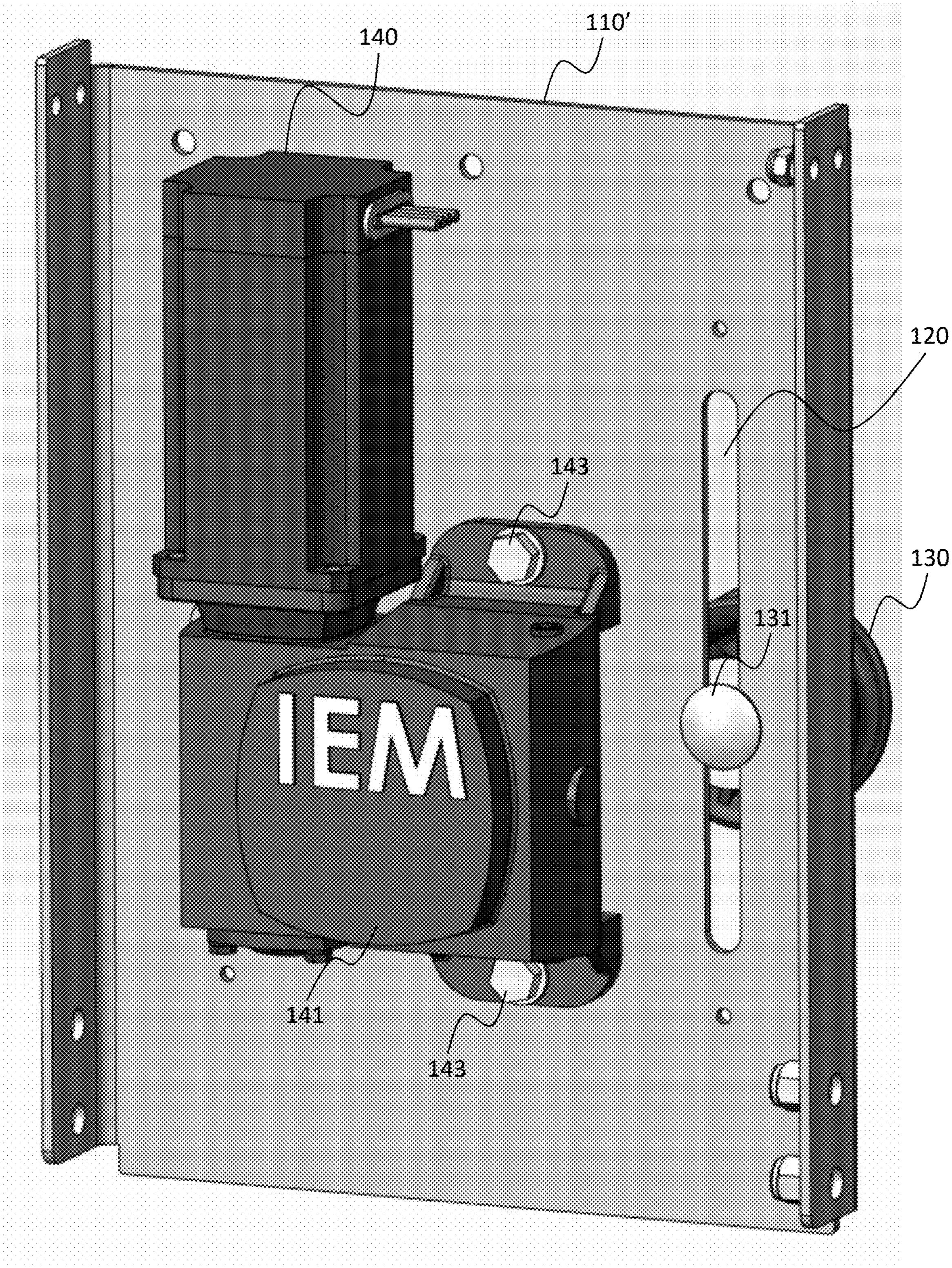
FIG. 13 is an alternative exemplary partial schematic of a gate operator with vertically adjustable idler sprockets and fixed drive unit/motor according to the inventive subject matter.
Figure 14:
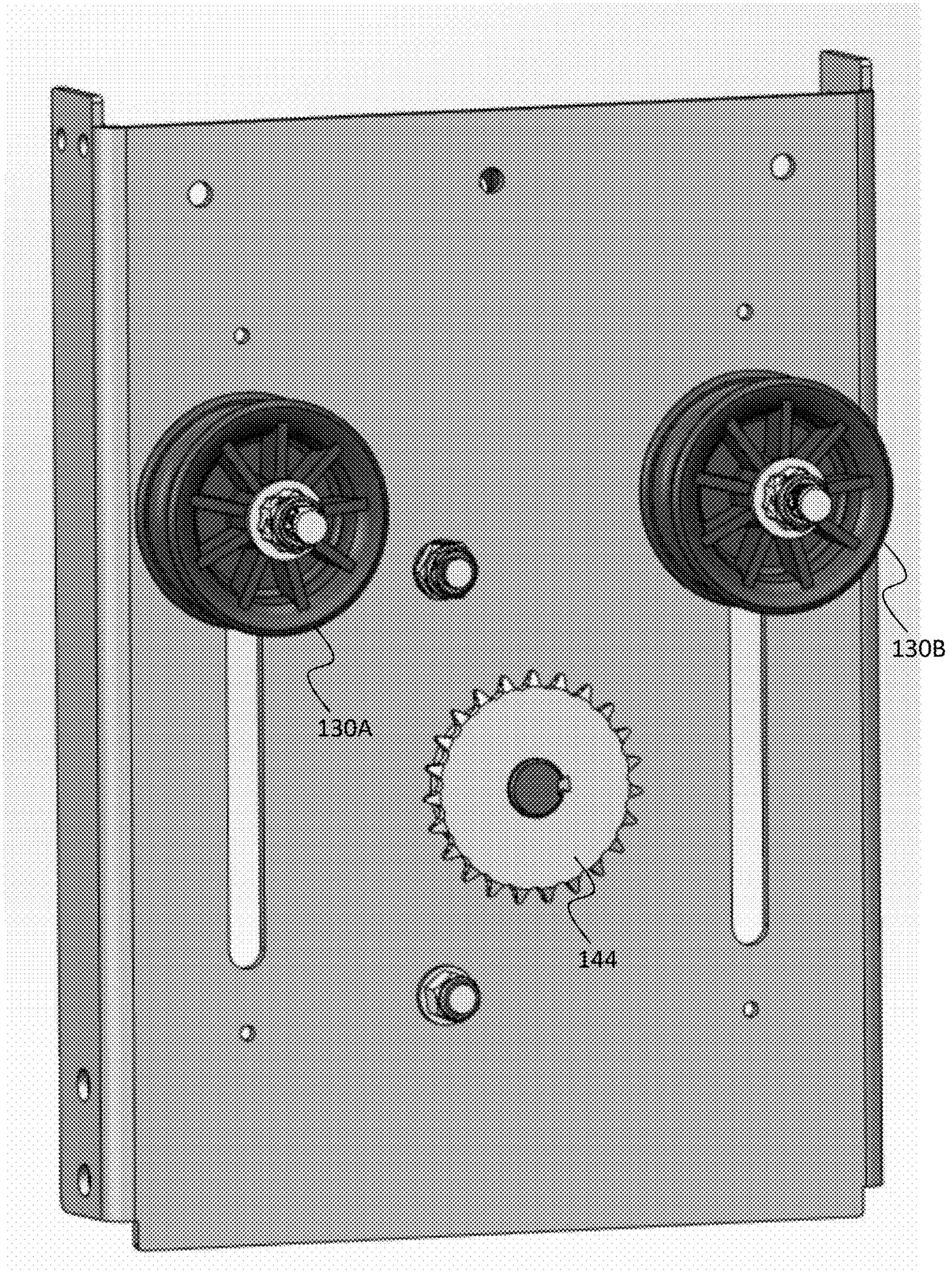
FIG. 14 is a first front view of the alternative gate operator of FIG. 13 with both idler sprockets in an upper position.
Figure 15:
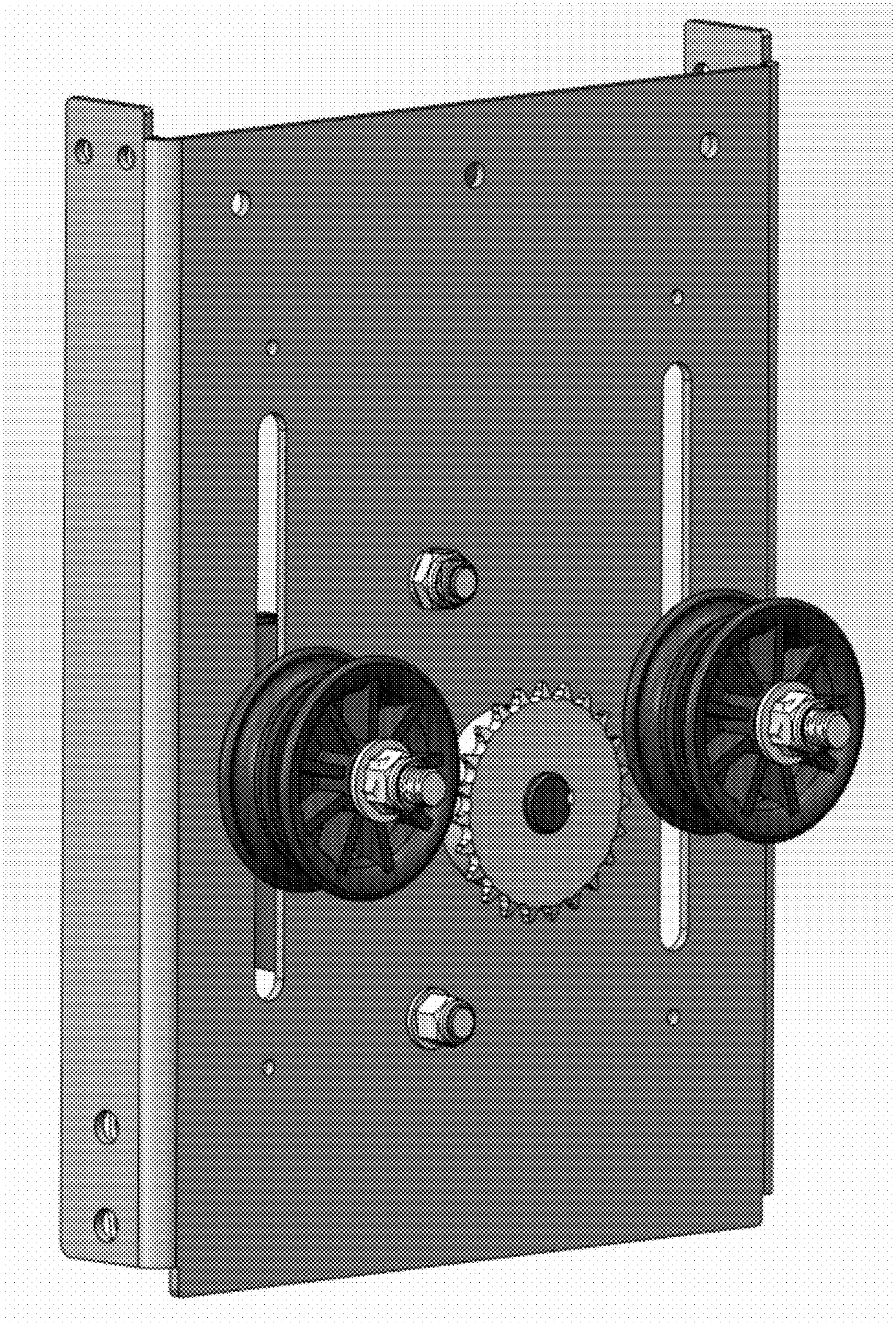
FIG. 15 is a first front view of the alternative gate operator of FIG. 13 with both idler sprockets in an intermediate lower position.
Figure 16:
FIG. 16 is a first front view of the alternative gate operator of FIG. 13 with one idler sprocket in a lower position and the other idler sprocket in an upper position.

Exemplary embodiments for such alternate configurations are shown in FIGS. 13-16. More specifically, FIG. 13 is a perspective rear view depicting a mounting structure 110' to which a motor 140 and a drive unit 141 are coupled in a vertically fixed position using through holes and corresponding screws/nuts 143. Here, the mounting interface 120 in the mounting structure 110' is configured as a slotted channel through which attachment bolt 131 extends to affix idler sprocket 130 at a desired vertical position along the interface 120. FIG. 14 depicts the perspective front view of the device of FIG. 13. As can be readily seen, both idler sprockets 130A, 130B are positioned at the upper end of the mounting interface while the gear 144 is in a fixed position (via fixed coupling of the motor and drive unit). FIG. 15 and FIG. 16 depict the same device in which the idler sprockets have different vertical positions.

Therefore, and viewed from a different perspective, it should therefore be appreciated that the mounting structure may be part of the housing of a gate operator or a separate structure that will typically be enclosed by a housing of the gate operator. Moreover, it is contemplated that the mounting structure may include one or more additional elements (channels, multiple through holes, etc.) that allow for correction of a horizontal offset between the gear/idler sprocket and the gate bracket. Preferably, such additional elements will allow adjustment for horizontal offset during or after the mounting structure housing is coupled to a base (e.g., concrete slab or other foundation). Thus, the mounting structures contemplated herein may be part of a new installation or be part of a retrofit installation.

Likewise, it is contemplated that the mounting structure is enclosed in a housing, the housing may include a mechanism that allows for horizontal adjustment (relative to the gate) to so additionally or alternatively accommodate for horizontal offset. For example, guiderails or slotted channels may be employed to fix the mounting structure to the ground or housing of the gate operator in any desired position. As will be readily appreciated, the mounting structure may include a number of mounting interfaces to which the idler sprocket (s), motor, drive unit, and other elements can be movably coupled. As used herein, the term "movably coupled" refers to a manner of coupling in which the coupled element (e.g., idler sprocket) is movable to more than one among a plurality of vertical positions, and in which the coupled element can be releasably fastened to a desired vertical position.

Therefore, it should also be noted that the mounting interface must allow for locking the sprocket and/or motor and/or drive unit at least temporarily in a selected position. Therefore, contemplated interfaces will preferably have a screw, clamp, lever, or wedge type locking device. Alternatively, friction locks, or tooth or spike-based locking mechanisms are also contemplated. In further aspects of the inventive subject matter, it should be appreciated that the mounting interface will allow for continuous adjustment in any desired vertical position. Most typically, the continuous adjustment will operate via sliding engagement (e.g., in a channel or along a rod or railing), however, discontinuous adjustment is also expressly contemplated herein (e.g., via a plurality of through holes in vertical (and optionally also horizontal) direction) Moreover, it is contemplated that the mounting interface(s) can be integral to mounting structure (e.g., as slotted channel) or may be coupled to the mounting structure (e.g., as a bracket, rod, raised channel, railing, etc.)

In further embodiments, it is contemplated that the mounting interface will allow for a meaningful travel distance for the motor, drive unit, and/or idler sprocket(s). For example, suitable distances for idler sprockets are at least 3 inches, or at least 5 inches, or at least 10 inches, or at least 15 inches, or at least 20 inches. For example, contemplated distances will be between 1-5 inches, or between 5-10 inches, or between 10-20 inches, etc. Likewise, the travel distance for the motor may be at least 1 inch, or at least 2 inches, or at least 3 inches, or at least 5 inches, or at least 10 inches. For example, contemplated distances will be between 0.5-2.5 inches, or between 2-5 inches, or between 5-10 inches, etc.

While the particular nature of the idler sprocket is not limiting to the inventive subject matter, it is contemplated that the idler sprocket will be sized and dimensioned to engage and/or guide the chain or belt that is coupled to the gate bracket. As such, it should be appreciated that conventional idler sprockets for gate operators can be used. In addition, it is contemplated that the idler sprocket may have a width beyond conventional idler sprockets and may have multiple parallel 'channels' that can accommodate for a potential horizontal offset. Thus, an installer may place the chain or belt over the idler sprocket into a channel that is closer or farther away from the mounting structure. On the other hand, conventional idler sprockets may also be coupled to the mounting interface using a spacer or an axle that is dimensioned to accommodate for horizontal offset.

With respect to suitable motors and drive units for use herein it is contemplated that all known motors and/or drive units may be used so long as the motor has sufficient power to move the gate under operating conditions at a speed that is customary for gate operators. Therefore, a motor may be coupled to a drive unit that has a reduction gear. Alternatively, a drive unit may be omitted where a direct drive motor is employed.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment.

The recitation of ranges of values herein is merely intended to serve as a shorthand method of referring individually to each separate value falling within the range. Unless otherwise indicated herein, each individual value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise. As also used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

What is claimed is:

1. A method of replacing a previously installed gate operator for a movable gate having a gate bracket, comprising:

- removing the previously installed gate operator from a base and installing a replacement gate operator to the base, wherein the replacement gate operator comprises a mounting structure to which are coupled (i) a motor that is coupled to a drive unit and (ii) an idler sprocket, the idler sprocket being movably coupled to the mounting structure via a mounting interface allowing for vertical adjustment of the idler sprocket to any position within the mounting interface, wherein the mounting interface includes first and second guide rails mounted on the mounting structure and defining a slot and a channel therebetween and includes an idler sprocket mounting shaft extending through said slot and said channel; and
- adjusting the idler sprocket to a position in which a chain coupling the idler sprocket to the gate bracket has no vertical offset between a location where the chain is at a horizontal tangent to the idler sprocket and extends toward the gate bracket and a location where the chain couples to said gate bracket.

2. The method of claim 1, wherein the replacement gate operator further comprises:

- a second idler sprocket, wherein the second idler sprocket is movably coupled to the mounting structure via a second mounting interface allowing for vertical adjustment of the second idler sprocket to any position within the second mounting interface.

3. The method of claim 1, wherein the motor is movably coupled to the mounting structure with a motor mounting interface allowing for vertical adjustment of the motor to any position within the motor mounting interface, said method further comprising vertically adjusting the motor relative to the base and affixing the motor to said motor mounting interface.

4. The method of claim 3, wherein the motor mounting interface is a slotted channel.

5. The method of claim 3, wherein the motor mounting interface allows the motor to be vertically adjusted over a distance of at least 2 inches.

6. The method of claim 1, further comprising adjusting the idler sprocket to a second position with no horizontal offset between the location where the chain is at the horizontal tangent to the idler sprocket and extends toward the gate bracket and the location where the chain couples to said gate bracket.

7. The method of claim 1, further comprising coupling the gate bracket to the drive unit and the idler sprocket via the chain.

8. The method of claim 1, wherein the mounting interface allows the idler sprocket to be vertically adjusted over a distance of at least 10 inches.

9. A method of correcting an offset of a gate operator from a gate bracket, comprising adjusting an idler sprocket from an initial position in which a chain coupling the idler sprocket to the gate bracket has a vertical offset between a location where the chain is at a horizontal tangent to the idler sprocket and extends toward the gate bracket and a location where the chain couples to said gate bracket to a new position in which the chain has no vertical offset between the location where the chain is at the horizontal tangent to the idler sprocket and extends toward the gate bracket and the location where the chain couples to said gate bracket, wherein the idler sprocket is moveably coupled to a mounting interface of a mounting structure of the gate operator, and wherein the mounting interface allows for vertical adjustment and fixing of the idler sprocket to the mounting structure at any position within the mounting interface, wherein the mounting interface includes first and second guide rails mounted on the mounting structure and defining a slot and a channel therebetween and includes an idler sprocket mounting shaft extending through said slot and said channel.

10. The method of claim 9 further comprising vertically adjusting a position of a motor of the gate operator relative to a base of said gate operator and fixing the motor relative to said base, wherein the motor is moveably coupled to a motor mounting interface of the mounting structure, and wherein the motor mounting interface allows for the vertical adjustment and the fixing of the motor at any position within the motor mounting interface.

* * * * *